(12) United States Patent
Shroll et al.

(10) Patent No.: US 11,047,737 B2
(45) Date of Patent: Jun. 29, 2021

(54) TEMPORAL-SPECTRAL MULTIPLEXING SENSOR AND METHOD

(71) Applicant: Spectral Sciences, Inc., Burlington, MA (US)

(72) Inventors: Robert M. Shroll, North Billerica, MA (US); Pajo Vujkovic-Cvijin, Salem, MA (US); Jamine Lee, Burlington, MA (US); Neil Goldstein, Belmont, MA (US); Marsha Fox, Lexington, MA (US); Michael Kogan, Dedham, MA (US)

(73) Assignee: Spectral Sciences, Inc., Burlington, MA (US)

( * ) Notice: Subject to any disclaimer, the term of this patent is extended or adjusted under 35 U.S.C. 154(b) by 63 days.

(21) Appl. No.: 16/661,254

(22) Filed: Oct. 23, 2019

(65) Prior Publication Data

US 2021/0123805 A1 Apr. 29, 2021

(51) Int. Cl.
*G01J 3/28* (2006.01)
*G01J 3/02* (2006.01)

(52) U.S. Cl.
CPC ........... *G01J 3/2823* (2013.01); *G01J 3/0294* (2013.01); *G01J 3/2803* (2013.01); *G01J 2003/2813* (2013.01); *G01J 2003/2826* (2013.01); *G01J 2003/2843* (2013.01)

(58) Field of Classification Search
None
See application file for complete search history.

(56) References Cited

U.S. PATENT DOCUMENTS

| | | | | |
|---|---|---|---|---|
| 2002/0156364 | A1* | 10/2002 | Madore | G01R 33/5611 600/410 |
| 2002/0172429 | A1* | 11/2002 | Boliek | H04N 19/593 382/240 |
| 2005/0111693 | A1* | 5/2005 | Loce | H04N 1/387 382/100 |
| 2007/0296969 | A1* | 12/2007 | Goldstein | G01J 3/0229 356/328 |
| 2010/0141829 | A1* | 6/2010 | Jalali | G06K 9/2036 348/370 |
| 2011/0285995 | A1* | 11/2011 | Tkaczyk | G01J 3/021 356/326 |
| 2016/0065915 | A1* | 3/2016 | Potter | H04N 9/09 348/273 |

* cited by examiner

*Primary Examiner* — Frank S Chen
(74) *Attorney, Agent, or Firm* — Brian M. Dingman; Dingman IP Law, PC

(57) ABSTRACT

A temporal-spectral multiplexing sensor for simultaneous or near simultaneous spatial-temporal-spectral analysis of an incoming optical radiation field. A spectral encoder produces a time series of spectrally encoded optical images at a high sampling rate. A series of full panchromatic spectrally encoded optical images are collected at a rate similar to the sampling rate. A detector records at least one spatial region of the spectrally encoded optical image. A processor is configured to process two series of spectrally encoded optical images to produce an artifact-free spectral image. The processing includes using the panchromatic images to normalize the spectrally encoded images, and decoding the normalized encoded images to produce high fidelity spectral signatures, free of temporal artifacts due to fluctuations at frequencies slower than the sampling rate for polychromatic images.

21 Claims, 4 Drawing Sheets

TEMPORAL-SPECTRAL MULTIPLEXING SENSOR AND METHOD

FIELD

This disclosure relates to an optical imaging sensor aimed at characterizing objects and events with distinct signatures in temporal and spectral domains. The sensor virtually simultaneously produces (1) two-dimensional spatial polychromatic images of the scene, (2) temporally resolved images, where each pixel is associated with its corresponding temporal frequency (vibration) spectrum, and (3) spectrally resolved images, where each pixel is associated with its corresponding optical spectrum. The sensor is based on Hypertemporal imaging (HTI) together with hyperspectral (HSI) or multispectral (MSI) imaging techniques described below. The sensor co-process the two data streams to provide spectral data free of temporal artifacts.

BACKGROUND

In the case of a spectrograph based on a spatial light modulator (SLM), the SLM provides the ability to spectrally encode the image by applying a pattern which binary-modulates the spectral content of each spatial element of the SLM. A set of hyperspectral images (i.e., a hypercube) is generated by first dispersing the light from a distant scene, encoding the light spectrally by using a SLM that selects specific combinations of bands, and then recombining the light on a two-dimensional detector (focal plane array) that records the spectrally encoded polychromatic signal. The full optical spectrum of each element (pixel) of the image can then be obtained by cycling the system through a sequence of spectral band passes generated on the SLM. It is well known to those skilled in the art to preferably use a sequence of spectral band passes based on Hadamard transform encoding, typically practically achieved by using Simplex (S) matrices for the binary transform applied to the SLM. This approach provides a sequence of orthogonal spectral bands for encoding, followed by decoding in a post-processing computer. The concept and sensor for spectral imaging based on dispersive optics and transform encoding is described in detail in Goldstein et al., U.S. Pat. No. 7,324,196; and Goldstein et al., U.S. Pat. No. 8,305,575, and references cited therein.

Goldstein et al., U.S. Pat. No. 7,324,196 teaches the construction and method of an imaging spectrograph containing a first optical path that produces a spectrally dispersed image of the input radiation field comprising multiple spectral components displaced along a dispersion direction. Spectral pass bands are encoded on the dispersed image by a spatial light modulator using one or more spatial masks. The imaging spectrograph further defines a second optical path that reverses the spectral dispersion of the first path and produces a spectrally-encoded polychromatic output image containing spectral components encoded by the spatial light modulator. The first and second optical paths share a common dispersing/de-dispersing optical element, while a detector records at least one spatial region of the spectrally encoded image.

Goldstein et al., U.S. Pat. No. 8,305,575 teaches the construction and method of an adaptive spectral sensor which uses a programmable band pass transmission filter to produce contrast signals, which discriminate specific target materials from background materials by comparing spectral signatures in hardware. The adaptive spectral sensor measures one or more spectra contained in a spectral image. The sensor automatically adjusts to changing spectral, spatial and temporal conditions in the environment being monitored, by changing sensor resolution in those dimensions and by changing the detection band pass. The programmable band pass can be changed on-the-fly in real time to implement a variety of detection techniques in hardware or measure the spatial or spectral signatures of specific materials and scenes.

Hypertemporal imaging (HTI) is used for object or event detection based on the temporal information contained in the optical field emanating from the object/field. Clark, U.S. Pat. Nos. 8,284,405 and 8,488,123 teaches a method that uses HTI technique to create a sensor based on a panchromatic (spectrally unresolved) optical detector which senses the intensity of time varying signals, from flickering sources, or from scattered light reflected by a vibrating surface. The detector produces an electrical signal as a temporal function of the detected light intensity. A digital signal processor converts the digital signal into a function of frequency using Fourier transform and power spectral density (PSD). The vibration signature of the source, if present, is discerned from a graphical display of the foregoing function. Villanucci et al. (U.S. Pat. No. 7,938,010) teach a passive remote sensor responding to spectrally unresolved electromagnetic radiation to generate a composite signal comprising a DC current component and an AC current component, followed by a filter that extracts the DC current component from the composite signal. At least a portion of the DC component is subtracted to produce a modified signal which detects vibrations of the surface to be detected, including by using Fourier transform. Slater (U.S. Pat. No. 7,551,519) teaches a passive long range acoustical sensor based on a method which uses natural broadband illumination to sense acoustical sources such as various types of sounds, vibrations, flutter, turbulence, and the like. Signal processing is based on various types of filtering and correlator functions.

Adler-Golden et al., 2008 teaches an approach to HTI analysis which improves event detection performance by several orders of magnitude compared to traditional power spectral density (PSD), AC power, and filtering methods described in Clark (U.S. Pat. No. 8,284,405 B1 and U.S. Pat. No. 8,488,123 B 1), Villanucci et al. (U.S. Pat. No. 7,938, 010 B2) and Slater (U.S. Pat. No. 7,551,519 B2). The basis of this approach is Principal Components Analysis (PCA), which defines a temporal whitening transform that converts the data covariance to unit variance. The whitened amplitude identifies weak events buried in a cluttered background. Strong signals therefore may appear in individual components of the whitened data (i.e., in the corresponding principal component images). Adler-Golden, S. M., S. C. Richtsmeier, and R. Shroll, "Suppression of subpixel sensor jitter fluctuations using temporal whitening," *Proc. SPIE*, vol. 6969, p. 69691D, (2008) further show how this approach can be applied to the analysis of data collected during a specific field experiment. Adler-Golden, S. M., et al, "Improved Analysis of Plume Hypertemporal Imagery Using Principal Components," *Proceedings of the 2nd Short Wavelength Phenomenology and Applications Workshop*, Johns Hopkins University/Applied Physics Laboratory, Laurel, Md., (2007) also teach an application of HTI analysis based on temporal whitening method to suppress the effects of sensor jitter which introduces non-white noise fluctuations in imagery of cluttered scenes. While standard frame-to-frame registration methods are known to have limited ability to model and remove fluctuations due to sensor jitter, the method demonstrated in Adler-Golden, S. M., et al., "Improved Analysis of Plume Hypertemporal Imagery Using Principal Components," *Proceedings of the 2nd Short Wavelength Phenomenology and Applications Workshop*, Johns Hopkins University/Applied Physics Laboratory, Laurel, Md., (2007) shows that a simple temporal whitening approach, applicable to a wide variety of imaging systems, is highly effective for suppressing subpixel jitter effects, leading to an improvement in event detection ability of the sensor.

SUMMARY

The temporal-spectral multiplexing sensor of this invention produces both panchromatic time series data and spectrally resolved imagery based on the collection of a sequence of spectrally encoded images. The panchromatic time series data is used for Hypertemporal Imaging (HTI) of the time varying signal in the scene. The spectrally encoded images can be created using either a set of fixed spectral band pass filters or a spectrograph based on a programmable spatial light modulator (SLM). In either case the processing of the spectral imagery is aided by periodic construction of full panchromatic images, which may be used to normalize the spectrally encoded images, thereby reducing spectral artifacts due to intensity fluctuations during the image collection event. The panchromatic images may be generated either by excluding spectral encoding for individual frames or by using a complementary spectral encoding on frames that combine with the spectrally encoded image frames to cancel the encoding.

This invention is not limited to spectrographs based on SLMs, but can also be used with fixed spectral bandpass filters. In that case, spectral multiplexing and programmable spectral resolution does not apply. Band-specific images are instead created by successively applying narrow band filters to the entire two-dimensional image. These narrow bandpass filters may be interspersed with spectrally flat filters to produce full panchromatic images for use in HTI processing and normalizing intensity fluctuations in an analogous manner to the SLM-based spectral imagers.

The temporal-spectral multiplexing sensor and method described in this invention unites HTI and HSI sensing in a single instrument using data encoding and signal processing to recover the temporal signal without HSI encoding artifacts, and to recover the HSI signal free from artifacts due to fluctuating target intensity. The later artifacts are a common problem for all spectral sensors, such as Fourier Transform Infrared Spectrometers (FTIR) or dispersive transform spectrometers, which rely on temporal stability of the collected signal. Any variation in the overall intensity of the return signal during the data collection process results in spurious spectral signals that distort the apparent spectrum of the object under interrogation. This invention reduces or removes such artifacts by continuous monitoring of the overall signal intensity and normalizing the spectrally encoded images as part of the decoding process.

The invention also allows the extraction of HTI data from spectrally encoded signals generated by a dispersive transform imaging spectrometer of the type described in Goldstein et al., U.S. Pat. No. 7,324,196 and Goldstein et al., U.S. Pat. No. 8,305,575. Such a spectrometer generates encoded polychromatic images that are decoded by an inverse transform to produce optical spectrum for each pixel of the image. These encoded polychromatic images generated by the dispersive transform imaging spectrometry method naturally contain signal intensity variations as a consequence of the encoding process itself because the spectral information is encoded in the time domain. For the purpose of HTI analysis, these variations translate into unwanted temporal oscillations added to the images that interfere with temporal analysis aimed at detecting the true temporal signature of the target at high fidelity. In this invention, we describe a method to use the encoded output of a dispersive transform imager to generate input data for HTI analysis that are free from encoding artifacts, and therefore equivalent to panchromatic images containing true spatial-temporal content, as described in the "Detailed Description of the Invention" section. The data processing approach for HTI sensing may include both Power Spectral Density (PSD) of the signal (based on the Fourier transform) and/or on Principal Component Analysis (PCA). PCA makes it possible to separate the target from unwanted background as described above in Adler-Golden, S. M., et al., "Improved Analysis of Plume Hypertemporal Imagery Using Principal Components," *Proceedings of the 2nd Short Wavelength Phenomenology and Applications Workshop*, Johns Hopkins University/Applied Physics Laboratory, Laurel, Md., (2007); Adler-Golden, S. M., S. C. Richtsmeier, and R. Shroll, "Suppression of subpixel sensor jitter fluctuations using temporal whitening," *Proc. SPIE*, vol. 6969, p. 69691D, (2008); Shroll, R., R. Sundberg, N. Goldstein, S. Richtsmeier, R. Kennett L. Jeong, W. Pereira, T. Cooley B. Noyes H. Scott, F. Iannarilli, S. Jones, *Detecting Rocket Plume Radiance through Cloud Layers from Spaced-Based Infrared Imaging Platforms*, MSS MD-SEA Symposium 22-25 Oct. (2012); resulting in the sensor's ability to distinguish a faint signal buried in brightly illuminated complex background. Several orders of magnitude improvement in the ability to detect target vs. background has been demonstrated with our approach relative to other approaches in Adler-Golden, S. M., et al., "Improved Analysis of Plume Hypertemporal Imagery Using Principal Components," *Proceedings of the 2nd Short Wavelength Phenomenology and Applications Workshop*, Johns Hopkins University/Applied Physics Laboratory, Laurel, Md., (2007); Adler-Golden, S. M., S. C. Richtsmeier, and R. Shroll, "Suppression of subpixel sensor jitter fluctuations using temporal whitening," *Proc. SPIE*, vol. 6969, p. 69691D, (2008).

The temporal-spectral multiplexing sensor described in this invention is aimed at the detection of an object or event displaying (1) a temporal frequency signature, such as mechanical vibration of the target or variation in target emission intensity, as in combustion or explosion processes, and (2) a distinct spectral signature. Both of these information domains are contained in the optical field emanating from the object/event surrounded by a background scene and captured within the field of view (FOV) of the sensor. The application of the sensor can be in the area of object or event characterization based on concurrent temporal and spectral analysis. The invention employs a fusion of Hypertemporal Imaging (HTI) detection in the temporal domain and Hyperspectral imaging (HSI) characterization in the spectral domain. While HTI and HSI monitoring with separate sensors is well known to those skilled in the art, this invention discloses an integrated multifunctional sensor that accomplishes both HTI and HSI sensing with a single optical system within a single instrument. The instrument simultaneously or near-simultaneously produces polychromatic (spectral band integrated grayscale), spectrally resolved, and temporally resolved images in real time. This capability makes the sensor advantageous for applications where there is a need to monitor an event or object which is distinguished by its signatures in those two domains. An example common in practical use of staring 2D sensors is related to the need to generate an early warning signal as soon as possible when a sudden change in the monitored scene occurs. The sudden change may be a transient event associated with an object within the scene. The event can be quickly captured in the temporal domain first, followed immediately by analyzing its optical signature in the spectral domain in order to spectrally characterize or classify the event. Alternatively the spectral and Hypertemporal data may be analyzed concurrently. Another notable capability of the sensor disclosed here is the ability to capture high fidelity spectral signatures from targets with temporally unstable radiance by using temporal correction as described below.

The simultaneous collection of both HTI and HSI data enables enhanced processing methods that improve detection and reduce clutter based on the simultaneous co-processing of the two data streams. This enables the collection of spectra from transient events and unstable sources with a spectral fidelity that cannot be matched by time-multiplexing spectral sensors alone.

Below we describe three techniques used to perform HTI analysis on the data captured by an imaging spectrometer. Two of the techniques describe the process for encoded polychromatic images produced by a dispersive transform HSI spectrometer. These images contain artifacts (temporal modulations) due to Hadamard encoding for spectral analysis. The encoding artifacts pollute the spatial and temporal content of collected images and need to be removed for HTI analysis to work. The third technique is related to combined spectral and temporal imaging with an apparatus based on spectral band filters. In this case, multispectral imaging (MSI) is typically performed with lesser number of spectral bands than used in HSI.

BRIEF DESCRIPTION OF THE DRAWINGS

Other objects, features and advantages will occur to those skilled in the art from the following description of the preferred and alternative embodiments of the invention, and the accompanying drawings, in which.

DETAILED DESCRIPTION

Figure 1:
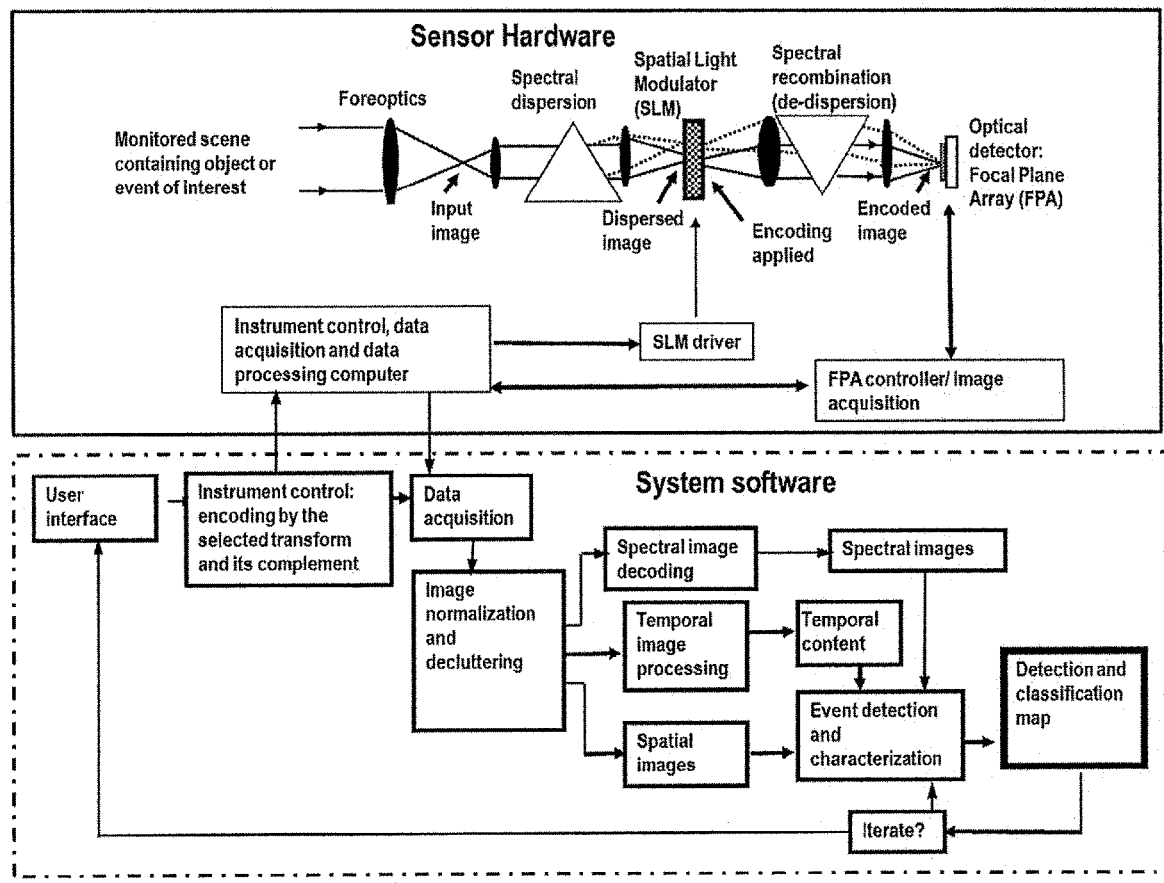
FIG. 1 is a schematic of the hardware and software for a preferred embodiment using a dispersive transform spectral imager.
Figure 2:
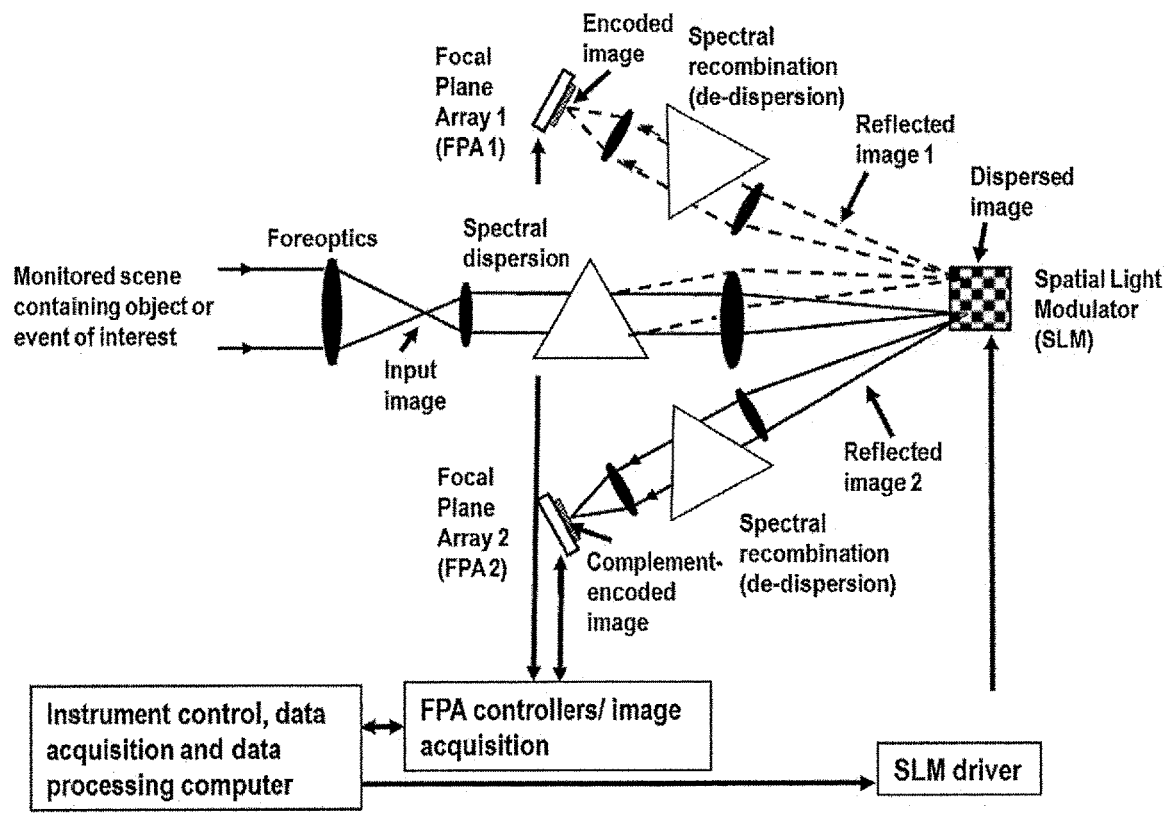
FIG. 2 is a schematic of a second hardware embodiment of a dispersive transform imager using multiple detectors to simultaneously record a spectral image and its compliment.
Figure 3:
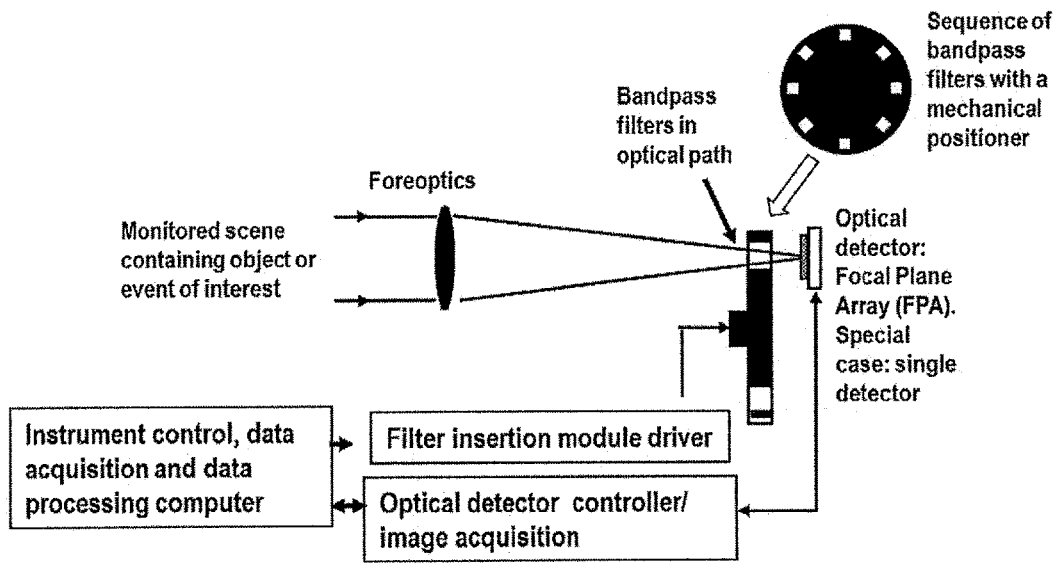
FIG. 3 is a schematic of a third hardware embodiment using fixed bandpass spectral filter.

FIG. 1 shows a schematic layout of the hardware and software for a dispersive transform imager that produces a series of spectrally encoded images and processes those images to produce HTI and HSI data. FIG. 1 uses a single FPA detector to collect the encoded images. FIG. 2 shows an alternative hardware embodiment of a dispersive transform imager with two focal plane array detectors. FIG. 3 shows an alternative embodiment for a sensor based on fixed bandpass spectral filters.

The dispersive transform embodiments of FIGS. 1 and 2 use a spectrometer to produce a dispersed image on a spatial light modulator that encodes a series of images using a series of spectrally-selective masks. In standard Hadamard transform encoding, each individual mask produces an encoded polychromatic image comprising the contribution of approximately half of all spectral bands the instrument collects. In each subsequent frame, a different set of approximately half of the bands is present in the image, and the process continues until the number of captured frames is equal to the number of spectral bands, N, at which time, a spectrum is recoverable for each pixel by weighted sums of the images. Even for temporally stationary input, polychromatic images vary and the sequence of captured images flickers.

The hardware of FIGS. 1 and 2 are used to collect complementary images containing complimentary sets of spectral bands that sum together to make a panchromatic image. Summation of a pair of such complementary-encoded images negates the encoding and produces a true temporally and spatially correct panchromatic image free of encoding artifacts. Such image can be successfully analyzed by HTI temporal analysis techniques. This panchromatic image can also be used to normalize the individual spectrally encoded frames prior to decoding, in order to remove spurious spectral features due to intensity fluctuations during the measurement cycle. Complementary images can be collected sequentially, using the hardware of FIG. 1, or captured simultaneously, on two different focal plane arrays (FPA) using the hardware of FIG. 2. In the latter case, the spatial light modulator would be a reflective, Digital Micro-mirror Array (DMA), in which each element of the array can be tilted to send the light in one of two directions, one towards FPA1 and the second towards FPA2.

The basic software structure and method of operations is common to all hardware embodiments. In each case, software running on a processor takes a sequence of images each encoded with a different spectral bandpass, and decodes the images to produce HSI and HTI data. It then combines the data to detect, characterize and classify the objects in the image.

Figure 4:
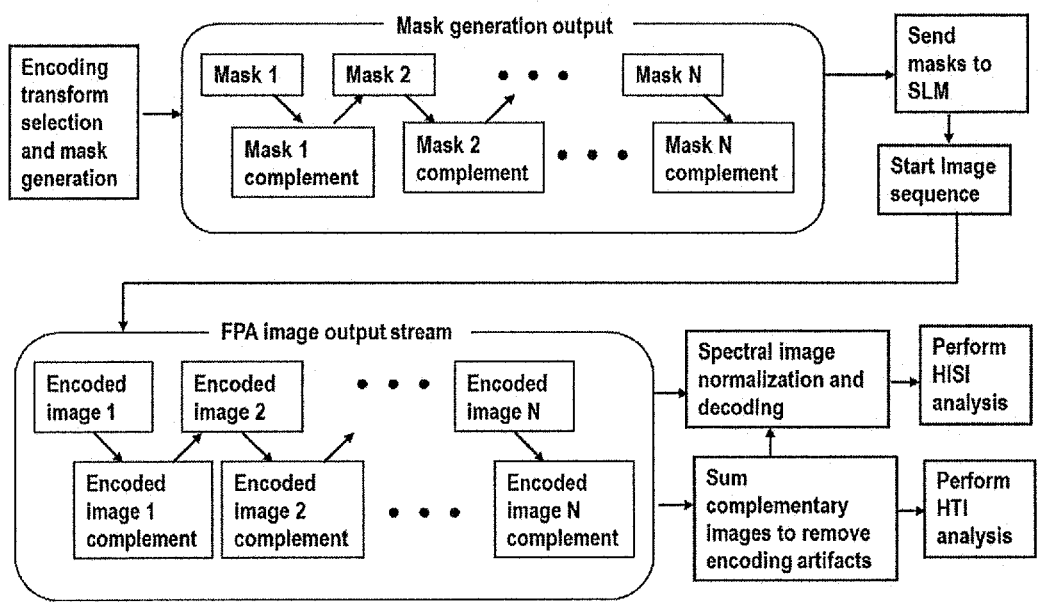
FIG. 4 is a schematic of the software block diagram showing the first method to generate and capture artifact-free spatial and temporal images with a dispersive transform spectral imager.

The software block diagram shown on FIG. 4 outlines this first method for the generation and capturing artifact-free spatial and temporal images with a dispersive transform spectral imager. This method is based on generating and capturing a set of complementary-encoded polychromatic images for each Hadamard mask, and summing the two complements to obtain the polychromatic image. Image encoding starts with the selection of the encoding transform, followed by executing an algorithm that generates the encoding spatial mask and transfers it to the SLM. In the case of Hadamard transform, encoding is accomplished by using a Simplex (S) matrix containing digital ones and zeros. The complement matrix is created by replacing all the ones in the original matrix by zeros, and all the zeros by ones. A series of binary masks corresponding to the encoding transform and the complement of the selected transform are generated as described above and applied to the SLM. Each "mask" selects a specific combination of spectral bands as prescribed by the encoding transform, as taught in e.g. Goldstein et al., U.S. Pat. Nos. 7,324,196 and 8,305,575. The mask sequence is applied repetitively while recording a series of image frames, one for each applied mask and its compliment. From the generated image stream, a series of artifact-free, panchromatic spatial images is created by summation of complementary images as described above, and the resulting data are analyzed by HTI processing algorithms. The spectrally encoded images are normalized to the total intensity in the summed compliments, and then decoded using the inverse transform, to produce spectral imagery that is fed to the HSI processing algorithms. HSI and HTI data are updated periodically, based on the last N set of encoded compliments. The HSI data may be updated on every frame, and is fully refreshed every N frames.

For the hardware of FIG. 2, both complements are acquired simultaneously, and a unique set of spectral data is collected for every N exposures. For the hardware of FIG. 1, the compliments are introduced sequentially, which doubles the time taken to generate an entire Hadamard encoded sequence for spectral analysis; a unique set of data is collected for every 2N exposures. In this case, however, two valid spectrally encoded sequences are created in that time interval, thereby improving the signal-to-noise ratio by $2^{1/2}$ due to signal averaging.

Figure 5:
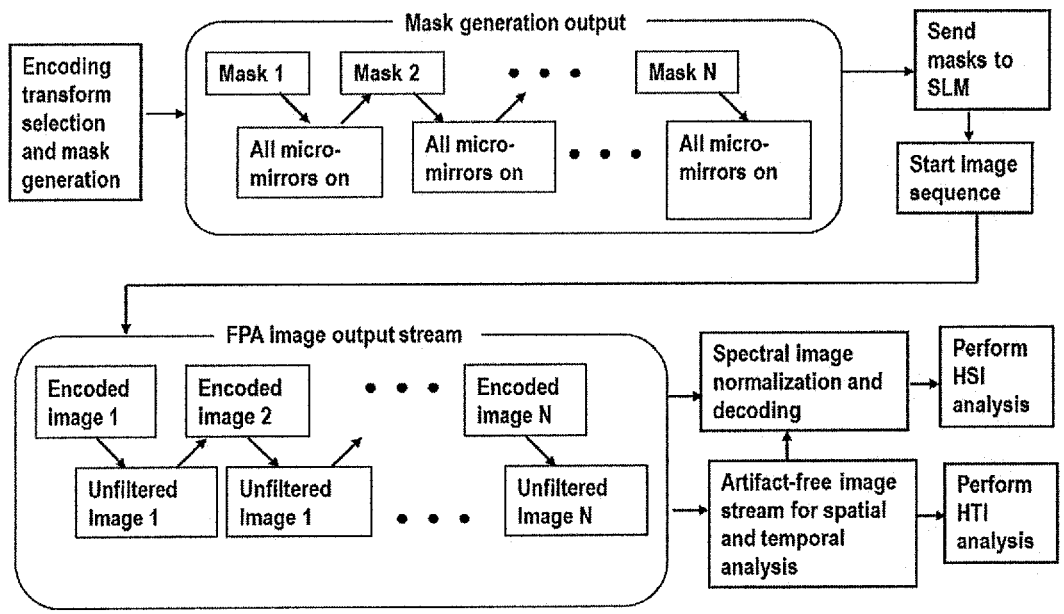
FIG. 5 is a schematic of the software block diagram showing the second method to generate and capture artifact-free spatial and temporal images with a dispersive transform spectral imager.

The second method that may be used for generation and capturing artifact-free spatial and temporal images with a dispersive transform spectral imager is illustrated in the software block diagram shown on FIG. 5. In this case we do not use a complement mask, but rather insert a mask with all micromirrors in the "on" position, producing interleaved, unfiltered spectral images. This approach produces essentially equivalent information to the first method, as the complement of the spectral image can then be generated by subtracting the spectral image from the "on" image. In contrast to method 1, the unfiltered spatial image is produced directly, and need not be synthesized from the two complements. All other data processing proceeds as in method 1. The spectral results are the same, but only ½ as many spectral measurements are made per unit time.

Figure 6:
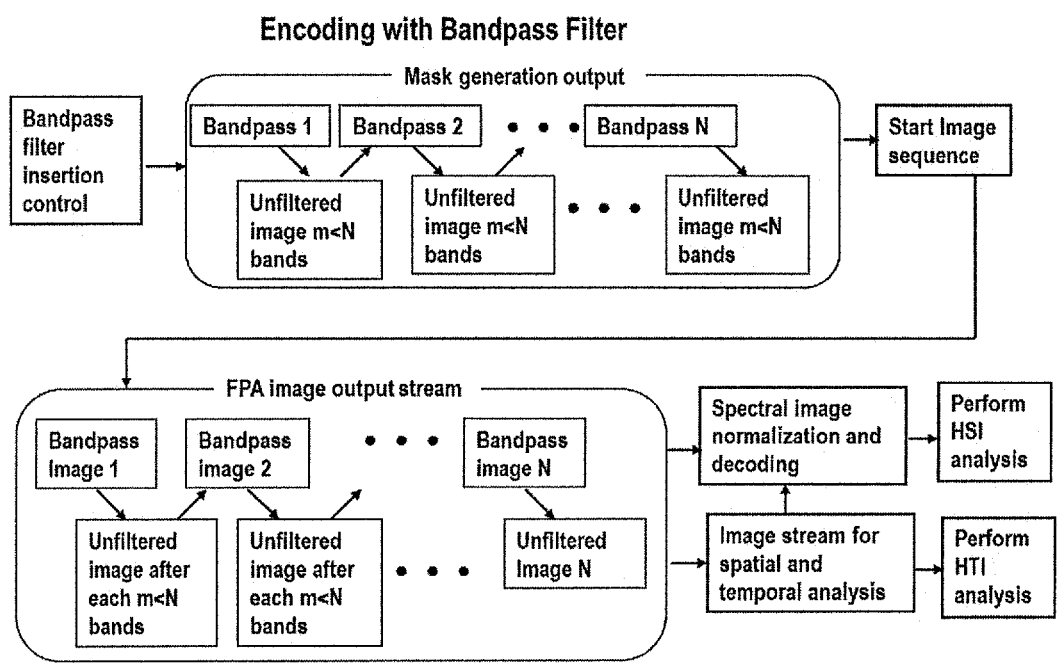
FIG. 6 is a schematic of the software block diagram showing the method to generate and capture artifact-free spatial and temporal images with a bandpass filter-based spectral imager.

The third method to perform spectral/temporal data acquisition applies to a spectrometer that uses fixed spectral bandpass filters instead of transform-based encoding. See FIG. 3. In this case, the instrument operates by sequentially inserting bandpass filters in the image plane of the sensor resulting in the creation of a MultiSpectral Imaging (MSI) data stack. The data processing for this embodiment is shown in FIG. 6. The data stack may contain unfiltered images in addition to the filtered ones in order to provide additional images to monitor the overall image intensity. The unfiltered images can be inserted between each filtered image, or on a periodic basis to produce a set of m unfiltered images for every N filtered images, where m<N. Image processing otherwise proceeds as in method 2 (FIG. 5). HTI analysis can be performed on filtered or unfiltered images as above, or on spectrally filtered images, providing that filtered images are collected with the same filter. The higher signal level in unfiltered images may be used for HTI analysis to gain better sensitivity. The unfiltered images may also be used to normalize the filtered images in an analogous manner to the Hadamard-encoded imagery.

One of the most stressing cases for a spectrometer is recovering a spectrum with intensity variations during the sampling interval. For example, intensity variations may result from changes in source emittance, illumination conditions, reflectance properties, turbulence, or sensor motion. The effect on the measured spectrum is an additional signal, termed clutter, that obscures the spectrum. The sampling rate of a standard spectrometer is the reciprocal of the time required to generate a spectrum, and it sets a limit on the sample stability required to avoid unacceptable clutter levels.

In standard time-multiplexed spectrometers, accurate measurement of a spectrum requires it to be stable, while intensity versus wavelength is measured by taking a series of N samples. Herein we disclose a technique that reduces the stability requirement from the time required to take the full spectrum to the time required to take one sample (embodiment FIG. 2) or two samples (embodiments of FIGS. 1, and 3). During the same time, a temporal signal is recovered that is free from encoding artifacts typically present when recording spectra in a time series of samples. This signal is used to correct the spectrally encoded signals for intensity fluctuations. For instance, for a spectrum with 100 individual spectral channels the sample stability requirement is reduced by a factor of 50 (embodiments of FIGS. 1 and 3) or 100 (embodiment 2) and the temporal signal is recovered at half the sampling rate (FIGS. 1 and 3) or by a factor of 100 (embodiment FIG. 2).

A brief outline of the mathematics behind the procedure is presented here using integral transformation notation with a specific example presented afterwards in matrix notation. The description is general to spectrometers using any encoding transform including, the Hadamard Transform and Fourier Transform.

In standard spectrometers applicable to a stable signal, a spectrum $f(\lambda)$ is encoded into a function of time $g(t)$ by applying a transformation kernel, which is a series of masks $M(t, \lambda)$, $$g(t)=\int M(t,\lambda)f(\lambda)d\lambda$$

Note that $g(t)$ is the measured quantity and we would like to recover $f(\lambda)$. $g(t)$ is a temporal measurement with variations due to the kernel. The spectrum does not depend on time; therefore, $g(t)$ does not contain HTI information about the source being measured. In Hadamard spectroscopy $M(t, \lambda)$ is known as an S-matrix and in scanning or filter-based instruments $M(t, \lambda)$ is a series of band passes. The process is inverted to recover the spectrum, $$\hat{f}(\lambda)=\int M^{-1}(t,\lambda)g(t)dt$$

where $\hat{f}(\lambda)$ is the recovered value of $f(\lambda)$.

This procedure is applicable when the spectrum $f(\lambda)$ is only a function of $\lambda$. It does not work well for time varying signals, because in such cases the spectrum $s(t, \lambda)$ is a function of both time and wavelength. The time dependence passes through the transformation and corrupts the result. For the time dependent case, we employ the product solution, $$s(t,\lambda)=I(t)f(\lambda)$$

$$g(t)I(t)=\int M(t,\lambda)s(t,\lambda)d\lambda=\int M(t,\lambda)I(t)f(\lambda)d\lambda$$

The measured quantity now varies with time. We see that $s(t, \lambda)$ is the product of two data dimension of interest, $\hat{f}(\lambda)$ for HSI analysis and $\hat{I}(t)$ for HTI analysis. To separate these data dimensions, we introduce the innovation of the method of complementary matrices. When complementary matrices are measured, we can recover the integral over wavelength versus time $\hat{I}(t)$. This results in the three fundamental equations of the combined HTI/HSI method. The first two provide the decoupled HTI data dimension $\hat{I}(t)$ and the equation defining the complementary matrix, $$\hat{I}(t)=I(t)\int f(\lambda)d\lambda=\int (M(t,\lambda)+M^c(t,\lambda))I(t)f(\lambda)d\lambda=g(t)+g^c(t)$$

where $M(t, \lambda)+M^c(t, \lambda)=1$
$M^c(t, \lambda)$ is the series of complement masks, and $g^c(t)$ is the transformation with the complement masks. Thus, we have introduced $g^c(t)$ as an additional measured quantity. This is used to scale (normalize) the function of wavelength during inversion removing the time dependence. The result is the decoupled HSI data dimension $\hat{f}(\lambda)$, $$\hat{f}(\lambda)=\int M^{-1}(t,\lambda)g(t)I(t)I(t)^{-1}dt=\int M^{-1}(t,\lambda)g(t)dt$$

where $I(t)^{-1}=\int f(\lambda)d\lambda/\hat{I}(t)$ and $\hat{I}(t)\hat{I}(t)^{-1}=1$. When $g(t)+g^c(t)$ are obtained at slightly different times then these equalities are approximate. For the embodiment represented on FIGS. 1 and 3 and the methods shown in FIGS. 4 and 5, g(t) and $g^c(t)$ are sequential polychromatic frames, and the approximation is valid if the time variation is minimal between sequential frames.

Finally, decoupling the dimensions requires the solution of the second equation defining the complementary matrix, which may be done when any of the two terms are measured. For instance, the instrument may measure g(t) and 1 where 1 corresponds to a measurement excluding the transformation kernel. An example of using 1, is embodied in FIG. 2 and FIG. 4. Systems like the one embodied in FIG. 2 only need to use a time independent transformation kernel to separate the time and wavelength dependence.

A mathematical embodiment of the invention consistent with the methods represented in the embodiment of FIG. 1-2 and methods of FIGS. 4 and 5 are presented here, which provides an example of using the above equations.

We start with a standard Hadamard Imager, which does not take advantage of the combined HTI/HSI processing of this invention. For an imaging sensor pixel over n integration time periods, we may define the vectors of $g_t$ (polychromatic, discrete time), $f_\lambda$ (discrete wavelength), and e (error) having dimensions of wavelengths×1. A matrix equation relates them through the S-matrix transformation (specific embodiment derived from the Hadamard transformation), $$g_t = S_{t\lambda} f_\lambda + e$$

which is a matrix representation of the integral transformation equation with S being a specific example of the more general transformation $M(t, \lambda)$. In the FIG. 4 embodiment, the transformation is done in hardware using a grating to disperse the light, a DMA to perform the transformation, and a grating to recombine the light. The process is repeated until the number of imager frames collected equals the number of spectral bands (i.e. the vectors can also be written as square matrices). Solving for the true spectrum $\hat{f}_\lambda$ by neglecting the error yields, $$\hat{f}_\lambda = S_{\lambda t}^{-1} g_t$$

Combining the two equations gives, $$\hat{f}_\lambda = f_\lambda + S_{\lambda t}^{-1} e$$

where the error in the spectrum is, $$S_{\lambda t}^{-1} e = \hat{f}_\lambda - f_\lambda$$

The matrix $S^{-1}$ is composed of 0 and 1, scaled by $2/(n+1)$. Thus, the mean square error for a spectral band is the variance multiplied by the $2/(n+1)$ or $2\sigma^2/(n+1)$. For n bands, the mean square error improvement factor over a single slit spectrometer is n/4 or the signal-to-noise ratio is increased by a factor of $\sim\sqrt{n}/2$.

For the embodiment shown in FIGS. 1 and 2, and method 4 of this invention two sets of polychromatic images are generated.

$$g_{2t_j} = S_{2t_j} f_\lambda \text{ and } g_{2t_{j+1}} = (1-S_{2t_{j+1}}) f_\lambda \text{ where } \{t_j | t_j = j\Delta t, j=0,2,4,\ldots,2(N_\lambda-1)\},$$

$t_j$ is the start of an integration time period, $\Delta t$ is the integration time, $N_\lambda$ is the number of wavelengths, and 1 is a matrix of all 1's (not the unit matrix). The error terms have been neglected to simplify the discussion. As before, the spectra are obtained by inversion. What makes this process uniquely beneficial is the summation of the two sets of equations, $$g_{2t_j} + g_{2t_{j+1}} = S_{2t_j} f_\lambda + (1-S_{2t_{j+1}}) f_\lambda = \hat{I}_{t_j}$$

yields a set of $N_\lambda$ images $\hat{I}_{t_j}$. For the case of sequential measurements, the intensities, $\hat{I}_{t_j}$, are approximations to the integrated band images over twice the integration time period capturing ½ of the photon flux (1's in the transformation matrices), and $\Delta \hat{t} = 2\Delta t$. If both transformations S and (1−S) are done at the same time (FIG. 2), then the approximation becomes an equality and the full photon flux is utilized and the $\Delta \hat{t} = \Delta t$. This is true because the rejected photons of one transformation, e.g. the zero elements of S, are the accepted photons of the other transformation, e.g. the one elements of (1−S), which corresponds to the embodiment shown in FIG. 6. For this embodiment, the matrix is symmetric, which means that once enough measurements are taken to invert the transformation (square matrix, i.e. the number of polychromatic images equals the number of wavelengths) then the inversion can be done after each additional measurement of the vector and complement pair. This yields an updated spectrum at the data rate of $1/\Delta \hat{t}$. (Full frame rate for simultaneous measurements, and half the frame rate for sequential measurements.)

The new transformation enables novel subspace hyperspectral/hypertemporal imaging techniques. For example, the topic of subspace hyperspectral imaging typically involves techniques that use hyperspectral images to define a vector space basis (via PCA or endmembers). The subspace is then a projection of reduced dimensionality in this basis (i.e. there are more pixels in the scene image than unique materials). Here we use a projection operator, which is generated from the summed complementary images (or a transformation free image), to generate a subspace in a vector space determined from temporal variances. The operator effectively describes temporal artifacts caused by line-of-sight motion "jitter clutter" and sensor noise, without being required to capture spectral variability or variability due to the multiplexing encoding.

Here we demonstrate how to use the vector space derived from temporal variance to improve the recovery of spectra with a method only applicable to the unique data generated by the hardware described herein. A set of clutter mitigated images L is generated by applying the projection operator to G matrices created from vectors $g_{2t_j}$ ($G_e$, even) and $g_{2t_{j+1}}$ ($G_o$, odd) with decoding using $S^{-1}$ and $(1-S)^{-1}$, $$L = G_e S^{-1} P + G_o (1-S)^{-1} P, \text{ where } P = aa^T$$

a is any subset of the eigenvectors of the covariance matrix (the choice is application dependent). P and the decoding matrices do not commute. The projector has row-column-dimensions of the number of summed complementary images and the encoded images have row-column-dimensions of the number of wavelengths. By design these dimensions are equivalent. L is the projection of the original set of encoded images in the reduced subspace defined by the projector.

To demonstrate how HSI analysis is performed with this novel clutter rejection we will use a standard projection method known as ACE (Adaptive Cosine Estimator). The technique gets is name because detections are based on the cosine of the angle between the background and target in the detection hyperspace. ACE usually refers to using the squared cosine. Here, without loss of generality, we will use the cosine.

To use ACE we need two vectors, the background and the target. These vectors can be written in terms of reflectance or radiance. L is an ordered set of background vectors, defined above, which are projections into a clutter mitigation subspace (defined above). They have been mean subtracted but still require whitening. The whitened background is, $$\tilde{L} = LC_L^{-1/2} \text{ and } C_L^{-1/2} = A_{C_L}\Lambda^{-1/2}A_{C_L}^T$$

where $C_L$ is the covariance matrix, $C_L^{-1/2}$ is the whitening operator $A_{C_L}$ is the matrix of covariance matrix eigenvectors, and $\Lambda$ is the diagonal matrix of eigenvalues. The target vector is treated in an equivalent way, $$\tilde{s} = sPC^{-1/2}$$

A known target vector (with ground reflectance, atmospheric transmittance, etc.) is projected into the clutter mitigation subspace (P) and then transformed with the whitening operator ($C^{-1/2}$).
The ACE detector is, $$ACE = \frac{\tilde{s}\tilde{l}}{\sqrt{\tilde{s}^T\tilde{s}}\sqrt{\tilde{l}^T\tilde{l}}}$$

which is the cosine of the angle between the vectors. $\tilde{l}$ is a single vector taken from $\tilde{L}$.

The result is a Hyperspectral-based detection, with reduced clutter due to temporal variations in the scene. Clutter induced-biasing of the spectral signal is either eliminated (embodiment 2, method 4) or effectively limited to a frequency range of $1/\Delta t = 2\Delta t$ for the embodiment of FIG. 1 and methods 4-5.

DESCRIPTION OF THE PREFERRED EMBODIMENTS

The sensor technology described herein may utilize Dispersive Transform Imaging Spectrometer (DTIS) technology as described in Vujkovic-Cvijin, P., N. Goldstein, M. J. Fox, S. D. Higbee, S. Latika, L. C. Becker, K. Teng, and T. K. Ooi, "Adaptive Spectral Imager for Space-Based Sensing," Proc. SPIE Vol. 6206, paper 6206-33 (2006); Vujkovic-Cvijin, P., Jamin Lee, Brian Gregor, Neil Goldstein, Raphael Panfili and Marsha Fox, *Infrared transform spectral imager*, SPIE Optics+Photonics, 12-16 Aug. 2012, San Diego Calif., SPIE Proceedings Vol. 8520, paper 8520-19 (2012); Goldstein, N., P. Vujkovic-Cvijin, M. Fox, B. Gregor, J. Lee, J. Cline, and S. Adler-Golden "DMD-based adaptive spectral imagers for hyperspectral imagery and direct detection of spectral signatures," SPIE Vol. 7210, 721008-1-721008-8 (2009); and U.S. Pat. No. 7,324,196, for example, to produce images with spatial, temporal and spectral content suitable for analysis by HTI/HSI algorithms described in this invention. FIG. 1 shows one embodiment of a spectral/temporal imager incorporating a programmable spatial light modulator (SLM) that allows programmable and adaptive selection of spectral bands. It incorporates a foreoptics to deliver an image into the object field of the instrument. As shown in FIG. 1, a DTIS instrument typically uses two polychromators with a two-dimensional SLM placed in the intermediate image plane between them. The polychromators may use any method to spectrally disperse the radiation (diffraction grating, a prism, a grism (combination prism and grating), or a combination thereof) to produce a dispersed image on the SLM, where each wavelength of light falls on a different SLM element, as shown in FIG. 1, which illustrates how rays for two different wavelengths, represented by dotted lines and solid lines, are focused on different locations on the SLM. The SLM can be a micromirror array (DMA), as described in Goldstein et al., U.S. Pat. Nos. 7,324,196 and 8,305,575, a reflective or diffractive ribbon array, a liquid-crystal array, an array of programmable apertures or any other one-dimensional or two-dimensional SLM. The first polychromator on FIG. 1 disperses the incoming image into spectral components and images them onto the DMA, where images are encoded by modulating the intensity of selected spectral bands. The encoded image is subsequently spectrally recombined by the second polychromator, which reversed the dispersion of the first polychromator, and imaged onto one or more detector arrays, such as a focal plane array (FPA). In a special case, the detector in the focal plane may contain one single detector. The DMA may be programmed to generate a dynamic series of spatial patterns (masks) that implement spectral encoding according to the mathematical transform selected for the particular application. The transform may be the Hadamard transform which provides high photon collection efficiency, since each of the Hadamard transform masks passes approximately half of the total photon flux collected, and each spectral channel is a normalized summation of half of the images. High photon collection efficiency results in high signal-to-noise (SNR) ratio. The implementation of the Hadamard transform may be in the form of Simplex (S) matrices, as described in U.S. Pat. Nos. 7,324,196 and 8,305,575. Spectral images may be decoded in the subsequent computation step via inverse Hadamard transform to yield spectral content of each pixel of the monitored scene. Since the instrument's SLM is programmable, it is possible to adjust spectral and temporal resolution in real time in order to optimize the tradeoff for dynamic monitoring requirements. Due to its encoding approach which involves both spectral dispersion and spectral recombination (de-dispersion) (FIG. 1), the FPA of the DTIS sensor captures a series of polychromatic images. The generation of spatially and temporally correct images from the encoded data is performed by the methods described above (FIG. 4 and FIG. 5) and described in detail above.

In another embodiment shown in FIG. 3, and the corresponding image processing method shown on FIG. 6, multispectral imaging is performed by applying a series of bandpass filters over the entire image. An example of such system is a scanning apparatus that uses a rotating filter wheel composed of individual bandpass filters designed to select and isolate spectral regions of interest. Positioning of filters within the wheel can be either sequential or random, controlled by a mechanical positioning system. In the case of a rotating positioner, a digitally controlled stepper motor is typically used. The positioner operates under the control of the computer, as instructed by the system software. Multispectral imaging resulting from this approach lacks the spectral resolution of a HSI system and may be slower due to the use of a mechanical filter-positioning system. Bandpass-filter based MSI imager may also be slower in its ability to reconfigure itself on the fly by a digital command compared to a DTIS HSI system. However, MSI systems are far less complex and far less costly than DTIS HSI systems. As is evident from the description above, both HSI and MSI systems are capable of combined spectral and temporal imaging, with a variety of data acquisition parameters.

Alternative Embodiments

In the case of DTIS-based transform-encoding imaging, alternative implementations may be used in the invention.

These can include systems with all transmissive or all reflective optics, and systems that use a combination of transmissive and reflective elements. Such systems may include spectrometers of both Offner and Dyson relay type, which both use nearly-concentric optical elements to achieve imaging with low optical aberrations. Several alternative embodiments that may be used for the optical system of the HTI/HSI sensor are described in U.S. Pat. Nos. 7,324,196 and 8,305,575.

In the case of complementary encoding, images may be acquired either by using a single focal plane array that sequentially captures two complementary encoded images created by a DMA (the preferred embodiment described above and in FIG. 1), or by recording the two images simultaneously. FIG. 2 shows an alternative implementation of the invention where the inherent mechanism of DMA spatial light modulation by micromirror tilting is used to advantage. As is well known to those skilled in the art, binary on-off modulation of DMA pixels is performed by tilting individual micromirrors by an equal angle in each direction relative to the normal to the underlying substrate. As a consequence, the DMA always generates two reflected images, inherently binary encoded with complementary transforms due to the complementarity of "on" and "off" pixels. Therefore, when a transform is applied to the DMA, one of the reflected images contains the original transform while the other reflected image is automatically encoded by the complement of the transform. If these two images are captured by two separated paths through the second polychromator (FIG. 2), input data for the summation process are created simultaneously by a single encoding mask. The separate paths can include 2 separate FPAs, as shown in FIG. 2, or alternatively, the two paths can be combined on a single FPA. As a result, of collecting both images simultaneously, the instrument acquires artifact-free spatial-temporal images at the full frame rate of the FPAs. This is in contrast to the case of a single FPA, where the need to generate the original and the complement mask sequentially makes the encoding sequence twice as long as the one with two FPAs.

The processing techniques of this invention can also be applied to Fourier Transform Spectrometers, provided that the spectrometers include means of measuring either the complement of the encoding transform, or the time-varying panchromatic intensity from the source.

Other embodiments will occur to those skilled in the art and are within the following claims.

What is claimed is:

1. A temporal-spectral multiplexing sensor for simultaneous or near simultaneous spatial-temporal-spectral analysis of an incoming optical radiation field, comprising:
   a spectral encoder that produces a time series of spectrally encoded optical images at a high sampling rate;
   means of collecting a series of full panchromatic spectrally encoded optical images at a rate similar to the sampling rate,
   a detector that records at least one spatial region of the spectrally encoded optical image; and
   a processor that is configured to process two series of spectrally encoded optical images to produce an artifact-free spectral image, wherein the processor is configured to:
      use the panchromatic images to normalize the spectrally encoded images, and
      decode the normalized encoded images to produce high fidelity spectral signatures, free of temporal artifacts due to fluctuations at frequencies slower than the sampling rate for polychromatic images.

2. The temporal-spectral multiplexing sensor of claim 1, where simultaneous spatial-temporal analysis comprises the co-processing of near-simultaneous and co-registered hyper-temporal and hyperspectral imagery to monitor, detect, identify, or characterize objects or events based on the combination of spectral and temporal signatures.

3. The temporal-spectral multiplexing sensor of claim 2, wherein the panchromatic signal is analyzed for its temporal content in order to reveal the frequency components of temporal signal oscillations due to changes in the object scene, such as mechanical vibrations or source emission changes, or to suppress line-of-sight motion induced signal variance.

4. The temporal-spectral multiplexing sensor of claim 2, wherein the image-to-image correlation between panchromatic images are used to generate a clutter mitigation projection operator that corrects the panchromatic and spectral imagery by projecting the images into a clutter-free subspace.

5. The temporal-spectral multiplexing sensor of claim 2, wherein object detection and/or characterization is based on combined HTI/HSI signatures, and where the analysis is performed by calculating power spectral density.

6. The temporal-spectral multiplexing sensor of claim 2, wherein at least one of object detection or characterization is based on combined HTI/HSI signatures, and where the analysis is performed by principal component analysis.

7. The temporal-spectral multiplexing sensor of claim 2, wherein at least one of object detection or characterization is based HTI analysis of a specific spectral band or combination of spectral bands.

8. The temporal-spectral multiplexing sensor of claim 7, wherein at least one of object detection or characterization comprises atmospheric absorption compensation for intensity-varying backgrounds.

9. The temporal-spectral multiplexing sensor of claim 2, wherein at least one of object detection or characterization comprises whitening of the spectral content prior to application of a detection operator, such as the ACE (Adaptive Cosine Estimator), or other projection operators.

10. The temporal-spectral multiplexing sensor of claim 2, wherein at least one of object detection or characterization comprises whitening of the temporal content prior to application of a detection operator.

11. The temporal-spectral multiplexing sensor of claim 2 wherein the panchromatic image stream is analyzed for its temporal content in order to reveal temporal frequency components of the signal, to suppress line-of-sight motion induced signal variance effect on HSI data fidelity, to capture high fidelity spectral signatures from targets with temporally unstable radiance or to perform object detection and/or characterization based on combined HTI/HSI signatures.

12. The temporal-spectral multiplexing sensor of claim 1, where the spectral encoder comprises:
   a system of alternately applying a selected encoding transform and the complement of the selected encoding transform simultaneously or sequentially; and
   the panchromatic images are produced by summation of the signals generated by the encoding transform with the signal generated by the complement of the encoding transform.

13. The temporal-spectral multiplexing sensor of claim 12, where the encoded image is captured by one detector and the complement of the encoded image is captured by another detector.

14. The temporal-spectral multiplexing sensor of claim 1, where the means of collecting the panchromatic image includes alternating spectrally encoded images with unencoded, panchromatic images.

15. The temporal-spectral multiplexing sensor of claim 14, where the spectral encoder applies a series of spectral band pass filters.

16. The temporal-spectral multiplexing sensor of claim 1, wherein using the panchromatic images to normalize the spectrally encoded images comprises applying a clutter mitigation projection operator, generated from the panchromatic images to the spectrally encoded images prior to decoding.

17. The temporal-spectral multiplexing sensor of claim 1 that allows capture high fidelity spectral signatures from targets with temporally unstable radiance.

18. The temporal-spectral multiplexing sensor of claim 1 where the spectral encoder comprises:
   a first polychromator that disperses the light to form a dispersed spectral image on a spatial light modulator, encoding a set of spectral bands by actuating specific areas of the spatial light modulator,
   a second polychromator that is configured to recombine the light; and
   a detector that is configured to form a spectrally encoded image.

19. The temporal-spectral multiplexing sensor of claim 1 where the detector comprises a single-element detector and captures a single spatial element.

20. The temporal-spectral multiplexing sensor of claim 1 where the detector comprises a linear array of optical detectors and captures a linear array of spatial elements.

21. The temporal-spectral multiplexing sensor of claim 1 where the detector comprises a two-dimensional array of optical detectors which capture a two-dimensional image.

* * * * *